United States Patent
Husemann et al.

(10) Patent No.: US 6,878,775 B2
(45) Date of Patent: Apr. 12, 2005

(54) PRESSURE-SENSITIVE ADHESIVE FEATURING LOW OUTGASSING

(75) Inventors: Marc Husemann, Hamburg (DE); Stephan Zöllner, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 10/075,041

(22) Filed: Feb. 12, 2002

(65) Prior Publication Data

US 2002/0161129 A1 Oct. 31, 2002

(30) Foreign Application Priority Data

Feb. 24, 2001 (DE) .......................................... 101 09 067

(51) Int. Cl.$^7$ .......................... C08L 33/08; C08L 33/10
(52) U.S. Cl. ........................... 525/78; 525/80; 525/87; 525/94; 525/148
(58) Field of Search ............................. 525/78, 80, 87, 525/94, 148

(56) References Cited

U.S. PATENT DOCUMENTS

| | | | |
|---|---|---|---|
| 5,403,658 A | 4/1995 | Southwick et al. | 428/355 |
| 5,681,654 A | 10/1997 | Mamish et al. | 427/354 |
| 5,761,184 A | 6/1998 | Dauber et al. | 369/247 |
| 5,763,548 A | 6/1998 | Matyjaszewski et al. | 526/135 |
| 5,767,210 A | 6/1998 | Lecomte et al. | 526/166 |
| 5,789,487 A | 8/1998 | Matyjaszewski et al. | 525/301 |
| 5,811,500 A | 9/1998 | Dubois et al. | 526/145 |
| 5,854,364 A | 12/1998 | Senninger et al. | 526/192 |
| 5,945,491 A | 8/1999 | Matyjaszewski et al. | 526/111 |
| 6,114,482 A | 9/2000 | Senninger et al. | 526/172 |
| 6,126,865 A * | 10/2000 | Haak et al. | 252/512 |
| 6,432,529 B1 | 8/2002 | Harder et al. | 428/355 |
| 6,552,116 B1 * | 4/2003 | Pakusch et al. | 524/460 |

FOREIGN PATENT DOCUMENTS

| | | | | |
|---|---|---|---|---|
| DE | 198 07 752 A1 | 8/1999 | ............... | C09J/7/02 |
| EP | 0 621 326 A1 | 10/1994 | ............... | C09J/7/02 |
| EP | 0 660 187 A1 | 6/1995 | ............ | G03F/7/039 |
| EP | 0 824 110 A1 | 2/1998 | ............... | C08F/4/00 |
| EP | 0 824 111 A1 | 2/1998 | ............... | C08F/4/00 |
| EP | 0 826 698 A1 | 3/1998 | ............... | C08F/4/00 |
| EP | 0 850 957 A1 | 7/1998 | ............... | C08F/4/40 |
| EP | 0 937 761 A1 | 8/1999 | ............... | C09J/7/04 |
| EP | 0 841 346 B1 | 9/1999 | ............... | C08F/4/00 |
| EP | 1 008 640 A1 | 6/2000 | .......... | C09J/153/00 |
| EP | 1 101 808 A2 | 5/2001 | ............... | C09J/7/02 |
| EP | 1 127 934 A1 | 8/2001 | .......... | C09J/153/00 |
| JP | 11199832 | * | 7/1988 | |
| WO | WO 98/01478 | 1/1998 | ............... | C08F/2/38 |
| WO | WO 99/31144 | 6/1999 | ............... | C08F/2/38 |
| WO | WO 01/44400 A1 | 6/2001 | .......... | C09J/153/02 |

OTHER PUBLICATIONS

U.S. Appl. No. 10/077,658, filed Feb. 2002, Husemann et al.*
U.S. Appl. No. 08/847,395, filed Apr. 20, 1994, Harder et al. (corresponds to EP 0 621 326 A1).
Abstract, Avery Dennison Corp., "STN RAPRA (Specialty Tapes)", STN RAPPA (Adhesives Age 34, No 8, Jul. 1991, p. 6).

* cited by examiner

Primary Examiner—James J. Seidleck
Assistant Examiner—Olga Asinovsky
(74) Attorney, Agent, or Firm—Norris McLaughlin & Marcus PA

(57) ABSTRACT

A pressure-sensitive adhesive composition based on (co)polymers of acrylic acid and/or methacrylic acid and/or derivatives thereof which has an at least two-phase domain structure and also an outgassing level of less than 10 $\mu g/g$, based on the weight of the composition, when measured by the tesa method.

14 Claims, No Drawings

PRESSURE-SENSITIVE ADHESIVE FEATURING LOW OUTGASSING

The invention relates to a pressure-sensitive adhesive composition with very low outgassing, to a process for preparing it, and to an adhesive tape with such a composition.

Hotmelt processes operating with solvent-free coating technology are of growing importance for the industrial manufacture of pressure-sensitive adhesive (PSA) compositions. Environmental regulations and the increasing costs of conventional, solvent processes are accelerating this development. Besides SIS systems (styrene/isoprene/styrene copolymers), acrylic-based polymers as well are increasingly being applied from the melt as a film onto backing materials.

For specialty applications, especially in the field of electronics, PSA tapes featuring very low outgassing are needed. The PSA compositions used for this purpose can only be prepared by the hotmelt process, since PSA tapes coated from solution by the conventional methods always still contain significant fractions of residual solvent. For these fields of application, temperature-stable and shearing-resistant acrylic PSA tapes with very low outgassing are needed. Residues of solvent and of monomer may evaporate during application, especially at an elevated temperature, and may therefore lead to a solvent-containing atmosphere. This may cause a variety of problems. On the one hand, certain monomers are possessed of good electrical conductivity, so that the risk of short circuits increases. On the other, the solvents and/or monomers may result in the destruction of plastic parts and insulators. Efforts are therefore made to use acrylic PSA tapes of very high purity, possessing an extremely low tendency to outgas.

Proposals for low-outgassing PSA compositions and, respectively, for their preparation are made in a range of documents. For instance, U.S. Pat. No. 5,681,654 describes a low-outgassing PSA composition based on rubber. This PSA composition, however, was developed specifically for applications in automobile construction, where larger outgassing quantities are tolerated. Moreover, the rubber adhesive compositions used have a number of specific disadvantages in relation to polyacrylates, examples being lower thermal shearing resistance and a tendency to age as a result of oxidation of the double bonds that are present. Since ozone is frequently produced in the electronics sector, however, rubber adhesive compositions are unsuitable for use in this field of application.

U.S. Pat. No. 5,761,184 describes vibration damping materials which likewise possess a very low tendency to outgas. No limit on the outgassing that can be tolerated is specified in that document.

DE 198 07 752 A1 introduces a nonfogging adhesive tape, fogging referring to the condensation of evaporated volatiles from automotive interior trim on the windows. This self-adhesive tape comprises a nonfogging backing on at least one side of which a nonfogging PSA composition is applied. The adhesive composition used here is preferably one based on acrylic hotmelt. For the residual solvent content, a preferred limit of not more than 1% by weight is stated.

In order to obtain sufficient shearing resistance in the polyacrylate compositions, which is vital for their use, for example, for adhesive tapes, hotmelt processing or application to a backing material is normally followed by a crosslinking of the PSA composition. At the present time, crosslinking techniques by exposure to ultraviolet light (UV) or to electron beams (EBC) are among the processes most frequently employed. Thermal crosslinking techniques with metal chelates or polyfunctional isocyanates, which are employed preferentially with solvent systems, can be employed only with very great limitations, if at all, with the hotmelt technology.

For producing acrylic PSA tapes which are intended to possess low outgassing qualities, preference is given to UV crosslinking. The higher the energy of the radiation used, the greater the extent to which irradiation is accompanied by fragmentation of the polymer chains or of the monomers used; these fragments lead in turn to an increase in the outgassing level and to restrictions on the usefulness of the resultant product.

Besides the disadvantage of fragmentation during the radiation crosslinking of acrylic PSA compositions, there are further restrictions with this kind of crosslinking. For example, crosslinking may be incomplete, especially with PSA tapes where the application rate of the adhesive composition to the backing is more than 100 g/m$^2$. UV exposure, moreover, may be accompanied by fragmentation of the requisite photoinitiator, which again leads to the problems already depicted above, since volatiles are released in this case as well.

In order to set the necessary adhesive and PSA properties, adhesives or PSA compositions are generally admixed with resins. This term embraces, according to DIN 55947, "solid, hard to soft, organic, noncrystalline products having a more or less broad molecular weight distribution [ . . . ] Resins are generally only base materials [. . . ]". Resins naturally likewise include volatile components, so that admixture during the preparation of acrylic PSA compositions is likewise deleterious when said compositions are to have a very low outgassing level.

For PSA tapes for whose use very low outgassing is necessary, for application in the electronics industry, for example, therefore, it is preferred to employ PSA compositions which are crosslinked neither thermally nor by means of high-energy radiation. At the same time, the use of resins is to be avoided.

It is an object of the invention to supply pressure-sensitive adhesive compositions featuring very low outgassing, particularly for use in the electronics sector, whose preparation avoids the above-described disadvantages and problems of the prior art.

It has surprisingly been found that the outgassing of pressure-sensitive adhesive compositions can be lowered considerably by preparing them such that they are able to form multiphase domains.

Accordingly, claim 1 provides a pressure-sensitive adhesive composition based on (co)polymers of acrylic acid and/or methacrylic acid and/or derivatives thereof which has an at least two-phase domain structure and also an outgassing level of less than 10 $\mu$g/g, based on the weight of the composition, when measured by the method referred to as the tesa method in the experimental section.

In a first particularly preferred embodiment of the inventive pressure-sensitive adhesive composition, at least some of the (co)polymers are block copolymers of the general type P(A)-P(B)-P(A), where P(A) represents a homopolymer or copolymer block of the monomers A, possessing a glass transition temperature of from –80° C. to 0° C., P(B) represents a homopolymer or copolymer block of the monomers B, possessing a glass transition temperature of from 20° C. to 175° C., and the homopolymer or copolymer blocks P(A) and the homopolymer or copolymer blocks P(B) are insoluble in one another.

In a second very preferred embodiment, the blocks are assigned to the respective other monomers, so that at least some of the (co)polymers are block copolymers of the general type P(B)-P(A)-P(B), where P(A) represents a homopolymer or copolymer block of the monomers A, possessing a glass transition temperature of from −80° C. to 0° C., P(B) represents a homopolymer or copolymer block of the monomers B, possessing a glass transition temperature of from 20° C. to 175° C., and the homopolymer or copolymer blocks P(A) and the homopolymer or copolymer blocks P(B) are insoluble in one another.

The block copolymers may be used completely as P(A)-P(B)-P(A) blocks or completely as P(B)-P(A)-P(B) blocks. It is, however, also possible to use mixtures of these triblock copolymers and/or with diblock copolymers P(A)-P(B) and/or with the monoblocks P(A) and/or P(B), the choice of respective composition making it possible to influence the adhesive properties of the copolymers in accordance with desires and uses.

The monomers A are preferably selected from the group of the acrylates $CH_2=CHCOOR$ and/or methacrylates $CH_2=C(CH_3)COOR$ in which the groups R are alkyl radicals having from 4 to 14 carbon atoms, preferably those having from 4 to 9 carbon atoms. This characterization embraces not only blocks P(A) which consist exclusively of identical molecules A (each with the same number of carbon atoms) but also blocks which are based on different monomers A, where the radicals R contain from 4 to 14 carbon atoms.

Specific examples of compounds which can be used with outstanding effect in the sense of the invention and which come from the group specified above are n-butyl acrylate, n-pentyl acrylate, n-hexyl acrylate, n-heptyl acrylate, n-octyl acrylate, n-nonyl acrylate, and the branched isomers thereof, such as 2-ethylhexyl acrylate, for example.

Moreover, it is very advantageous in the sense of the invention if at least some of the monomers A have a functional group R' which is capable of coordinative crosslinking.

Furthermore, it has been found highly advantageous if at least some of the monomers A have a functional group R" which possesses a cohesion-enhancing effect for the homopolymer or copolymer P(A) and/or for the overall block copolymer.

Explicit mention may be made here of monomers A whose radicals are not only capable of coordinative crosslinking but also have a cohesion-enhancing effect for the block P(A), i.e., those wherein R'=R".

Particularly preferred examples of compounds having coordinative crosslinking and/or cohesion-enhancing properties are hydroxyethyl acrylate, hydroxypropyl acrylate, hydroxyethyl methacrylate, hydroxypropyl methacrylate, acrylic acid, methacrylic acid, allyl alcohol, maleic anhydride, itaconic anhydride, itaconic acid, acrylamide and glyceridyl methacrylate, although this listing is not closed.

Monomers A used optionally further include up to 30% by weight of vinyl monomers from the following groups: vinyl esters, vinyl ethers, vinyl halides, vinylidene halides, vinyl compounds having aromatic rings and heterocycles in the α position. Here again, certain examples may be mentioned without exclusion: vinyl acetate, vinyl formamide, vinylpyridine, ethyl vinyl ether, vinyl chloride, vinylidene chloride, acrylonitrile. As component B it is preferred to select monomers which are capable of forming a 2-phase domain structure with the copolymer blocks P(A). Advantageous examples of compounds which are used as component B are vinylaromatics, methyl methacrylates, cyclohexyl methacrylates, isobornyl methacrylates. Particularly preferred examples of component B are methyl methacrylate and styrene.

A further preferred feature of these block copolymers P(A)-P(B)-P(A) and, respectively, P(B)-P(A)-P(B) is that the molecular weight is situated between 5 000 and 600 000 g/mol, more preferably between 20 000 and 300 000 g/mol. The fraction of the polymer end blocks is advantageously between 10 and 60 percent by weight of the overall block copolymer, more preferably between 15 and 40 percent by weight.

For the preparation of the block copolymers of the invention it is possible to use any polymerization which proceeds in accordance with a controlled free-radical mechanism, such as, for example, ATRP (atom-transfer radical polymerization), nitroxide/TEMPO-controlled polymerization, or, with particular preference, the RAFT process (rapid addition-fragmentation chain transfer) or variants thereof, which may vary, for example, in the choice of regulators or initiators and/or the amounts thereof and in the frequency with which they are added. For the preparation it is possible, for example, to use a difunctional initiator.

For the polymerization of the block copolymers it is possible with preference to use nitroxide regulators, dithioesters or trithiocarbonates for free-radical control. The polymerization may be conducted in the presence of an organic solvent or in the presence of water or in mixtures of organic solvents and/or water, or in bulk. It is preferred to use as little solvent as possible. Depending on conversion and temperature, the polymerization time is between 6 and 48 h, and the conversion should be greater than 97%.

In the case of solution polymerization, preferred solvents used include esters of saturated carboxylic acids (such as ethyl acetate), aliphatic hydrocarbons (such as n-hexane or n-heptane), ketones (such as acetone or methyl ethyl ketone), special boiling point spirit, or mixtures of these solvents. For polymerization in aqueous media or in mixtures of organic and aqueous solvents, emulsifiers and stabilizers are preferably added for the polymerization. Polymerization initiators used are customary compounds forming free radicals, such as peroxides, azo compounds, and peroxosulfates, for example. Initiator mixtures are also outstandingly suitable. For free-radical stabilization use is made of nitroxides of type (Ia) or (Ib):

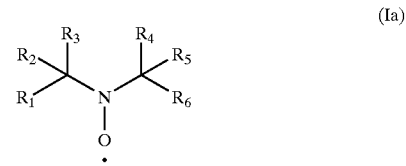

(Ia)

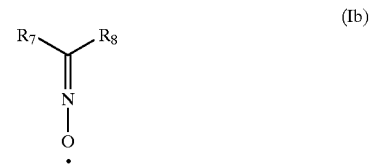

(Ib)

where $R_1$, $R_2$, $R_3$, $R_4$, $R_5$, $R_6$, $R_7$, and $R_8$ independently of one another denote the following compounds or atoms:

i) halides, such as chlorine, bromine or iodine ii) linear, branched, cyclic, and heterocyclic hydrocarbons having from 1 to 20 carbon atoms, which may be saturated, unsaturated, and aromatic, iii) esters —COOR$_9$, alkoxides —OR$_{10}$ and/or phosphonates —PO(OR$_{11}$)$_2$, where R$_9$, R$_{10}$, and R$_{11}$ stand for radicals from group ii).

The compounds (Ia) or (Ib) may also be attached to polymer chains of whatever kind and may therefore be used for the synthesis of the block copolymers as macroradicals or macroregulators.

With greater preference, compounds of the following type are used as controlled regulators for the polymerization:

2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL 2,2,6,6-tetramethyl-1-piperidinyloxypyrrolidinyloxyl (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6,-tetraethyl-1-piperidinyloxyl, 2,2,6-trimethyl-6-ethyl-1-piperidinyloxyl N-tert-butyl-1-phenyl-2-methylpropyl nitroxide N-tert-butyl-1-(2-naphthyl)-2-methylpropyl nitroxide N-tert-butyl-1-diethylphosphono-2,2-dimethylpropyl nitroxide N-tert-butyl-1-dibenzylphosphono-2,2-dimethylpropyl nitroxide N-(1-phenyl-2-methylpropyl)-1-diethylphosphono-1-methylethyl nitroxide di-t-butylnitroxide diphenylnitroxide t-butyl-t-amyl nitroxide As a further controlled polymerization method, use is made of atom transfer radical polymerization (ATRP), in which the initiator used preferably comprises monofunctional or difunctional secondary or tertiary halides and for abstraction of the halide(s) use is made of Cu, Ni, Fe, Pd, Pt, Ru, Os, Rh, Co, Ir, Cu, Ag or Au complexes [EP 0 824 111; EP 0 826 698; EP 0 824 110; EP 0 841 346; EP 0 850 957]. The various possibilities of ATRP are described further in the patents U.S. Pat. No. 5,945,491, U.S. Pat. No. 5,854,364, and U.S. Pat. No. 5,789,487.

A very preferred variant carried out is the RAFT process (reversible addition-fragmentation chain transfer). The process is described in detail in the patents WO 98/01478 and WO 99/31144. Suitable with particular advantage for preparing block copolymers are trithiocarbonates [Macromolecules 2000, 33, 243–245]. In one very advantageous variant, the trithiocarbonate (II) is used for the polymerization:

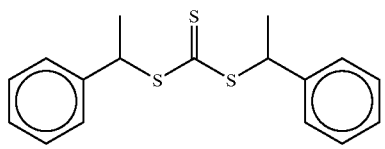

(II)

Following polymerization, the polymerization solution is concentrated. In order to ensure an appropriately low outgassing level of the acrylic PSA composition of the invention, the polyacrylate composition obtainable in this way is subjected advantageously to a postpurification.

The invention accordingly further provides a process for concentrating a pressure-sensitive adhesive composition based on acrylic monomers in accordance with the details given above, in which a polyacrylate solution obtainable by free-radical polymerization is used. In this process, concentration is carried out as follows: following polymerization, an entrainer is added to the polyacrylate solution and the polyacrylate solution with the added entrainer is passed into an extruder in which the polyacrylate solution is subjected to a carrier distillation. As a result of the concentration, a polyacrylate composition of a kind is produced which is processed further from the melt. In one very preferred procedure, directed in particular to the use of the composition as a PSA composition for adhesive tapes, the concentrated polyacrylate composition is applied to a backing material.

In the process of the invention, the solvent is removed under reduced pressure in a concentrating extruder, the solvent preferably being distilled off in different vacuum stages. The function of the entrainer is to remove solvents, impurities, and volatile components.

In an improved variant of the inventive process, following the concentration, a postpurification is carried out in at least one further step by adding the same or another entrainer to the concentrated polyacrylate composition and conducting a further carrier distillation in the extruder, preferably selecting in each case higher temperatures and lower vacuums than in the preceding distillation step. The composition is again freed from solvent, residual monomer, and impurities.

The extruder in the concentration step is preferably a corotating or counterrotating twin screw extruder. The concentration and the postpurification steps may be conducted in one and the same extruder or be in series. Where two or more extruders are used, it is advantageous to use twin screw extruders again for the postpurification steps, in which case it is also possible to select corotating or counterrotating extruders.

As a result of the advantageously selected monomer compositions, the stress undergone by the polyacrylate compositions in the extruder is low. Using, for example, polymers having molecular weights of approximately 600 000 ($M_w \approx 600\,000$ g/mol), the reduction in molecular weight in the extruder is only up to 5%.

In one outstanding procedure, the entrainer used for the distillation in the inventive process may be steam. Also suitable, however, are organic entrainers which are familiar to the skilled worker for carrier distillation.

In the case of steam distillation, the steam acts as a carrier for the more or less volatile substances that are to be removed from the pressure-sensitive adhesive composition. Even many high-boiling substances possessing little or no miscibility with water can be distilled in this way at as low as about 100° C. if they are heated together with water or if hot steam is passed through them during the distillation. One variant for removing relatively high-boiling components by steam distillation is to operate the distillation using superheated steam (at temperatures of approximately 130° C.).

Owing to the composition of the pressure-sensitive adhesive composition, there is no need for subsequent crosslinking by actinic radiation. As a result, the formation of fragments is prevented, and so the low outgassing level is not increased again.

Furthermore, the pressure-sensitive adhesive composition prepared in this way and/or the pressure-sensitive adhesive tape may optionally undergo brief heating. The introduction of heat may take place by irradiation—for example, by UV, IR or microwave radiation. The irradiation devices are advantageously coupled with a suction removal means. The pressure-sensitive adhesive composition is preferably heated by means of IR radiation in the wavelength range around 1700 cm$^{-1}$, during which the temperature of the pressure-sensitive adhesive composition should be at least 100° C., preferably 120° C. or more, but should not exceed an upper limit of 170° C.

Also claimed is an adhesive tape, particularly for use in the electronics industry, comprising applied to one or both sides of a backing material a film of a pressure-sensitive adhesive composition based on (co)polymers of acrylic acid and/or methacrylic acid and/or derivatives thereof which have an at least two-phase domain structure and also an outgassing level of less than 10 μg/g under the conditions already indicated above, and also a pressure-sensitive adhesive tape comprising a pressure-sensitive adhesive composition as described in the individual embodiments.

One very advantageous embodiment of this inventive adhesive tape possesses a backing material having a very low outgassing tendency, preferably of less than 5 μg/g, ideally of less than 3 μg/g.

EXAMPLES

Test Methods

A strip of the adhesive tape 13 mm wide was applied to a smooth, cleaned steel surface. The application area was 20 mm×13 mm (length×width). The following procedure was then undertaken:

Test A1. At room temperature, a 1 kg weight was fastened to the adhesive tape and the time recorded until the weight fell off.

Test A2: At 70° C., a 1 kg weight was fastened to the adhesive tape and the time recorded until the weight fell off.

The shear stability times measured are each recorded in minutes and correspond to the average of three measurements.

Measuring of the Outgassing Level (Tesa Method; Test B)

Sample Preparation

The adhesive compositions were coated onto PET film by the hotmelt technique. The application rate was about 50 g/m². Before or after UV exposure, a specimen area measuring approximately 40 cm² was cut from the sheet sample, scattered with glass beads (diameter: 60–80 μm), rolled up and transferred to a 25 ml glass headspace vessel. The sample was baked out at 100° C. under atmospheric pressure for 1 h and, finally, the volatile constituents were injected from the vapor space into the GC.

Analysis

The volatile constituents were determined by GC-MS, using the following instruments:

GC: Hewlett Packard HP 5890 SERIES II

MS: Hewlett Packard HP 5989 A

For the measurement, a DB-5 column 60 m long, 0.25 mm internal diameter and with a film thickness of 1 μm was installed. Measurement was carried out using a temperature program of 50° C. (3 min)–150° C./min–260° C. (2 min). The carrier gas used was hydrogen (90 kPa) with a flow rate of 1 ml/min. The split ratio was 1:10. The GC peaks were quantified against external standards.

Preparation of the Trithiocarbonate

As a regulator, the following trithiocarbonate (II) was prepared in accordance with Macromolecules 2000, 33, 243–245 and Synth. Commun. 1988, 18, 1531–1536.

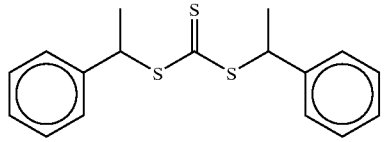

(II)

The commercially available Vazo 67™ (DuPont) is the chemical compound 2,2'-azo-bis(2-ethylpropionitrile).

Implementation of the Polymerizations

Trithiocarbonate-functionalized Polystyrene (A)

400 ml of styrene and 3.47 g of the trithiocarbonate (II) (0.01172 mol) were introduced into a 500 ml Schlenk vessel which was then degassed three times, after which the polymerization was conducted under argon. It was initiated by heating to 120° C. and continued for 30 h with stirring. To isolate the product the reaction mixture was cooled to RT, and the polymer was dissolved in 1 000 ml of dichloromethane and then precipitated from 7.5 L of methanol with vigorous stirring. The precipitate was filtered off on a frit and then analyzed by GPC ($M_n$=23 500, $M_{w/n}$=1.32).

Example 1

A reactor conventional for free-radical polymerizations was charged with 32 g of trithiocarbonate-functionalized polystyrene (A), 442 g of 2-ethylhexyl acrylate, 4.5 g of acrylic acid and 0.12 g of Vazo 67™ (DuPont). After argon has been passed through for 20 minutes and the reactor has been degassed twice, it was heated to 70° C. with stirring and polymerization was conducted for 16 h.

For isolation of the product, the reaction mixture was cooled to RT, the block copolymer PS-P(EHA/AS)-PS was diluted to 50% with acetone and then coated using a conventional doctor blade onto a low outgassing (<2 μg/g volatiles according to test method B), Saran-primed 23 μm PET backing, and then dried over 5 different stages at 60° C., 80° C., 100° C., 120° C., and 120° C. The average residence period in each temperature zone was 80 seconds. The application rate was 50 g/m². Testing was then conducted in accordance with test methods A and B.

Example 2

A reactor conventional for free-radical polymerizations was charged with 3.2 kg of trithiocarbonate-functionalized polystyrene (A), 44.2 kg of n-butyl acrylate, 4.5 kg of acrylic acid and 0.12 kg of Vazo 67™ (DuPont). After argon has been passed through for 20 minutes and the reactor has been degassed twice, it was heated to 70° C. with stirring and polymerization was conducted for 16 h.

In order to isolate the product, the reaction mixture was cooled to RT and the block copolymer PS-P(BA/AS)-PS was concentrated by means of a single-screw extruder (Bersdorff) with three devolatilizer units. The vacuum stages were 200 mbar, 60 mbar, and 9 mbar. The throughput of feed solution was 40 kg/h, the entering solution having been preheated to 120° C. by means of a feed preheater. The exit temperature of the acrylic hotmelt PSA composition was approximately 130° C.

Thereafter, steam was passed for 2 minutes through the hotmelt PSA composition, which was purified in a corotating twin screw extruder (Welding Engineers) to remove water/an impurities mixture, and then the adhesive composition was coated from the melt through a slot die onto a low-outgassing (<2 μg/g volatiles according to test method B), Saran-primed 23 μm PET backing. The application rate was 50 g/m². Testing was then carried out in accordance with test methods A and B.

Example 3

The procedure of Example 2 was repeated. The pressure-sensitive adhesive composition was coated from the melt through a slot die onto a low-outgassing (2 μg/g volatiles according to test method B), Saran-primed 23 μm PET backing. The application rate was 50 g/m². Heat treatment was then carried out over 3 different stages at 120° C., 130° C., and 130° C. The average residence period in each temperature zone was 60 seconds. Testing was then carried out in accordance with test methods A and B.

Comparative Example C1

UV-AC Resin 203™ (BASF AG) was coated using a hotmelt coating apparatus onto a low-outgassing (<2 μg/g volatiles according to test method B), Saran-primed 23 μm PET backing. The application rate was 50 g/m². Testing was then carried out in accordance with test methods A and B.

Comparative Example C2

UV-AC Resin 203™ (BASF AG) was coated using a hotmelt coating apparatus onto a low-outgassing (<2 pg/g volatiles according to test method B), Saran-primed 23 μm PET backing and then exposed twice at 20 m/min using a UV unit (Eltosch; medium pressure mercury lamp, 120 W/cm², full power). The application rate was 50 g/m². Testing was then carried out in accordance with test methods A and B.

Results

The outgassing results are shown in table 1:

TABLE 1

| Example | Volatiles [μg/g] |
|---------|------------------|
| 1 | 8 |
| 2 | 7 |
| 3 | 9 |
| C1 | 150 |
| C2 | 240 |

The results show that the UV-AC Resins™, which are prized for their low outgassing characteristics, still contain very large amounts of volatiles (C1). Where the UV AC-Resin 203™ is used for hotmelt coating and is crosslinked using a conventional UV-C source, the pressure-sensitive adhesive tape as a whole still possesses volatiles of about 240 μg/g adhesive composition (C2). Volatiles detected were the following compounds: acetone, 2-methylpentane, 3-methylpentane, hexane, ethyl acetate, 2-methyl-1-propanol, 1-butanol, 2,4-dimethylpentane, cyclohexane, 3-methylhexane, 1,2-dimethylcyclopentane, heptane, methylcyclohexane, toluene, 3-methylheptane, ethylbenzene, p-xylene, 2-butyl propanoate, 1,3-dimethylbenzene, benzene, butyl formate, butanal, and isobutene.

The amounts measured are too large for sensitive applications in the electrical and the electronics industries. In contrast, the acrylic block copolymers of examples 1 to 3 show clearly better outgassing characteristics. All three pressure-sensitive adhesive compositions meet the standard of less than 10 μg/g volatiles. Since, as a result of the formation of domains in the polystyrene blocks, no crosslinking is needed (see table 2), no additional volatiles are produced, as is commonly the case as a result of the actinic irradiation employed for crosslinking. Accordingly, it is possible to obtain pressure-sensitive adhesive tapes having particularly favorable outgassing characteristics.

Table 2 lists the shearing resistance of the examples:

In the following table, the adhesive properties of these compositions are listed.

TABLE 2

| Example | SST RT/A1 | SST 70° C./A2 |
|---------|-----------|---------------|
| 1 | +10 000 | +10 000 |
| 2 | +10 000 | +10 000 |
| 3 | +10 000 | +10 000 |
| C1 | 5 | >5 |
| C2 | 755 | 185 |

SST: Shear stability times in minutes

Examples 1 to 3 demonstrate that, as a result of the formation of hard block domains, the acrylic block copolymers have a very high shearing resistance. The uncrosslinked reference specimen C1, in contrast, possesses virtually no cohesion. Reference example C2 is significantly more shearing-resistant owing to the UV crosslinking.

What is claimed is:

1. A pressure-sensitive adhesive composition based on (co)polymers of acrylic acid methacrylic acid, derivatives of acrylic acid or methacrylic acid, or combinations thereof, which has an at least two-phase domain structure and also an outgassing level of less than 10 μg/g, based on the weight of the composition, when measured by the tesa method.

2. The pressure-sensitive adhesive composition as claimed in claim 1, wherein at least some of the (co)polymers are block copolymers of the general type P(A)-P(B)-P(A), where P(A) represents a homopolymer or copolymer block of the monomers A, possessing a glass transition temperature of from −80° C. to 0° C., P(B) represents a homopolymer or copolymer block of the monomers B, possessing a glass transition temperature of from 20° C. to 175° C., and the homopolymer or copolymer blocks P(A) and the homopolymer or copolymer blocks P(B) are insoluble in one another.

3. The pressure-sensitive adhesive composition as claimed in claim 1, wherein at least some of the (co)polymers are block copolymers of the general type P(B)-P(A)-P(B), where P(A) represents a homopolymer or copolymer block of the monomers A, possessing a glass transition temperature of from −80° C. to 0° C., P(B) represents a homopolymer or copolymer block of the monomers B, possessing a glass transition temperature of from 20° C. to 175° C., and the homopolymer or copolymer blocks P(A) and the homopolymer or copolymer blocks P(B) are insoluble in one another.

4. The pressure-sensitive adhesive composition as claimed in claim 2 or 3, wherein the monomers A are selected from the group consisting of the acrylates $CH_2=CHCOOR$, methacrylates $CH_2=C(CH_3)COOR$ and combinations thereof, in which the groups R are alkyl radicals having from 4 to 14 carbon atoms.

5. The pressure-sensitive adhesive composition as claimed in claim 2 or 3, wherein at least some of the monomers A have a functional group R' which is capable of coordinative crosslinking.

6. The pressure-sensitive adhesive composition as claimed in claim 2 or 3, wherein at least some of the monomers A have a functional group R" which possesses a cohesion-enhancing effect for the homopolymer or copolymer P(A), for the overall block copolymer or for both.

7. A process for preparing the pressure-sensitive adhesive composition of claim 1, using a polyacrylate solution obtainable by free-radical polymerization, which comprises a concentration process in which
following polymerization, an entrainer is added to the polyacrylate solution,
the polyacrylate solution with the added entrainer is passed into an extruder in which the polyacrylate solution is subjected to a carrier distillation,
as a result of the concentration a polyacrylate composition is produced which is processed further from the melt
and the concentrated polyacrylate composition, optionally, is applied to a backing material.

8. The process as claimed in claim 7, wherein, following the concentration, a postpurification is carried out in at least one further step by adding the same or another entrainer to the concentrated polyacrylate composition and conducting a further carrier distillation in the extruder.

9. The process as claimed in claim 7 or 8, wherein at least the extruder in the concentration step is a corotating or couterrotating twin screw extruder.

10. The process as claimed in claim 7 or 8, wherein steam is used as entrainer.

11. An adhesive tape comprising a backing material having applied to one or both sides at least one film of a pressure-sensitive adhesive composition as claimed in claim 2 or 3.

12. The adhesive tape as claimed in claim 7, wherein said backing material has an outgassing tendency of less than 5 $\mu g/g$.

13. The pressure-sensitive adhesive composition of claim 4, wherein said alkyl radicals have 4 to 9 carbon atoms.

14. The process of claim 8, wherein said further carrier distillation is conducted at higher temperatures and lower vacuum than the preceding distillation step.

* * * * *